US011633875B2

(12) United States Patent
Fujie et al.

(10) Patent No.: US 11,633,875 B2
(45) Date of Patent: Apr. 25, 2023

(54) BOTTOM FACE PROCESSING METHOD OF PILLAR-SHAPED HONEYCOMB STRUCTURE, MANUFACTURING METHOD OF FIRED HONEYCOMB STRUCTURE, AND MANUFACTURING METHOD OF JOINED BODY

(71) Applicant: NGK INSULATORS, LTD., Nagoya (JP)

(72) Inventors: Nobuhiro Fujie, Nagoya (JP); Yuji Watanabe, Nagoya (JP); Ken Itadu, Nagoya (JP); Yoshihiro Sato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 749 days.

(21) Appl. No.: 16/354,759

(22) Filed: Mar. 15, 2019

(65) Prior Publication Data
US 2019/0299487 A1 Oct. 3, 2019

(30) Foreign Application Priority Data

Mar. 27, 2018 (JP) .............................. JP2018-060669

(51) Int. Cl.
B28B 11/00 (2006.01)
F01N 3/022 (2006.01)
(Continued)

(52) U.S. Cl.
CPC .............. *B28B 11/007* (2013.01); *B23C 3/00* (2013.01); *B23P 15/00* (2013.01);
(Continued)

(58) Field of Classification Search
CPC ... B28B 11/007; B28B 3/269; B28B 17/0081; B28B 3/20; B28B 11/00; B29C 63/0013;
(Continued)

(56) References Cited

U.S. PATENT DOCUMENTS

2004/0242130 A1* 12/2004 Kato ........................ G11B 5/84
451/56
2006/0169384 A1 8/2006 Fujita et al.
(Continued)

FOREIGN PATENT DOCUMENTS

CN 106264363 A 1/2017
CN 106481390 A 3/2017
(Continued)

OTHER PUBLICATIONS

German Office Action (Application No. 10 2019 001 998.9) dated Jan. 17, 2020.
(Continued)

*Primary Examiner* — S. Behrooz Ghorishi
(74) *Attorney, Agent, or Firm* — Burr & Brown, PLLC

(57) ABSTRACT

A bottom face processing method of a pillar-shaped honeycomb structure including steps of:
preparing a pillar-shaped honeycomb structure including a plurality of first cells which extend in parallel with each other from a first bottom face to a second bottom face, and each of which is opened in the first bottom face and has a protruding plugged portion in the second bottom face, and
a plurality of second cells each of which is adjacent to at least one of the first cells with a partition wall interposed therebetween, which extend in parallel with each other from the first bottom face to the second bottom face, and each of which has a protruding plugged portion in the first bottom face, and is opened in the second bottom face; and
removing the protruding portion from the plugged portion of each of the first cells and the second cells of the pillar-shaped honeycomb structure.

9 Claims, 4 Drawing Sheets

(51) Int. Cl.
- *B28B 11/18* (2006.01)
- *B24B 27/00* (2006.01)
- *B24B 55/06* (2006.01)
- *B23C 3/00* (2006.01)
- *B28B 11/24* (2006.01)
- *C04B 38/00* (2006.01)
- *B28B 11/12* (2006.01)
- *B28B 11/08* (2006.01)
- *B23P 15/00* (2006.01)

(52) U.S. Cl.
CPC .......... *B24B 27/0076* (2013.01); *B24B 55/06* (2013.01); *B28B 11/006* (2013.01); *B28B 11/08* (2013.01); *B28B 11/0845* (2013.01); *B28B 11/12* (2013.01); *B28B 11/18* (2013.01); *B28B 11/243* (2013.01); *C04B 38/0019* (2013.01); *F01N 3/0222* (2013.01); *B23P 2700/03* (2013.01); *Y10T 29/49345* (2015.01)

(58) Field of Classification Search
CPC ........ B01D 2239/0428; B01D 39/2068; B01D 46/2418; C04B 38/0012; C04B 2111/00793; C04B 35/00; C04B 38/0019; F01N 3/022; E01H 1/045; E01H 1/042
See application file for complete search history.

(56) References Cited

U.S. PATENT DOCUMENTS

| | | | |
|---|---|---|---|
| 2008/0079194 A1* | 4/2008 | Kumagae | B28B 11/006 264/259 |
| 2009/0229765 A1* | 9/2009 | Furukubo | B28B 11/006 156/757 |
| 2011/0262639 A1* | 10/2011 | Sato | C04B 41/87 427/181 |
| 2017/0057196 A1 | 3/2017 | Mori et al. | |
| 2017/0284264 A1 | 10/2017 | Izumi et al. | |

FOREIGN PATENT DOCUMENTS

| | | |
|---|---|---|
| DE | 10 2017 002 809 A1 | 10/2017 |
| JP | 2001-300922 A1 | 10/2001 |
| JP | 2004-261625 A | 9/2004 |
| JP | 2008-132749 A | 6/2008 |
| JP | 2009-220298 A1 | 10/2009 |

OTHER PUBLICATIONS

Chinese Office Action (with English translation), Chinese Application No. 201910183095.8, dated Sep. 3, 2021 (20).

Japanese Office Action (with English translation), Japanese Application No. 2018-060669, dated October 12, 2021 (6 pages).

* cited by examiner (a)          (b)

(a)　　　　　　　(b)

BOTTOM FACE PROCESSING METHOD OF PILLAR-SHAPED HONEYCOMB STRUCTURE, MANUFACTURING METHOD OF FIRED HONEYCOMB STRUCTURE, AND MANUFACTURING METHOD OF JOINED BODY

TECHNICAL FIELD

The present invention relates to a bottom face processing method of a pillar-shaped honeycomb structure. Moreover, the present invention relates to a manufacturing method of a fired honeycomb structure utilizing the bottom face processing method. Further, the present invention relates to a manufacturing method of a joined body utilizing the manufacturing method of a fired honeycomb structure.

BACKGROUND ART

Exhaust gas discharged from an internal combustion engine such as a diesel engine contains a large amount of particulates (particulate matter) which is composed mainly of carbon, and causes environmental pollution. Therefore, in general, a filter for collecting particulates is equipped in an exhaust system of a diesel engine, etc.

As an example of such filter, there is known a pillar-shaped honeycomb structure 500 (see FIG. 5) including: a plurality of first cells 508 which extend in parallel with each other from a first bottom face 501 to a second bottom face 504, and each of which is opened in the first bottom face 501 and has a plugged portion 502 in the second bottom face 504; and a plurality of second cells 510, which extend in parallel with each other from the first bottom face 501 to the second bottom face 504, and each of which has a plugged portion 502 in the first bottom face 501 and is opened in the second bottom face 504, wherein the plurality of first cells 508 and the plurality of second cells 510 are adjacently disposed in an alternate manner with a partition wall 505 interposing between each pair of them.

In this kind of filter, particulate matter is collected by a mechanism as described below. Upon being supplied with exhaust gas containing particulate matter to the first bottom face 501 on the upstream side of the pillar-shaped honeycomb structure 500, the exhaust gas is introduced into the first cell 508 and advances toward the downstream in the first cell 508. Since the first cell 508 is plugged in the second bottom face 504 on the downstream side, the exhaust gas passes through a porous partition wall 505 which partitions between the first cell 508 and the second cell 510, and flows into the second cell 510. Since particulate matter cannot pass through the partition wall 505, it is collected in the first cell 508. The clean exhaust gas which has flown into the second cell 510 advances toward the downstream in the second cell 510, to be discharged from the second bottom face 504 on the downstream side.

One possible manufacturing method of a pillar-shaped honeycomb structure having a plugged portion is as follows (examples: Japanese Patent Laid-Open No. 2009-220298 and Japanese Patent Laid-Open No. 2001-300922). A mask including an adhesive layer is bonded to one bottom face of an unfired honeycomb structure; apertures are made by a laser processing utilizing image processing, etc. in portions of the mask to cover cells on which plugged portion should be arranged; thereafter the bottom face part bonded with the mask is immersed in a plugging slurry to fill the plugging slurry into end parts of the cells from the apertures and is dried; and the mask bonded to the bottom face is peeled off. The plugged portion is also formed on the other bottom face in a similar manner. Thereafter, by firing the pillar-shaped honeycomb structure having the plugged portion, a fired honeycomb structure is obtained and can be used as a filter.

CITATION LIST

Patent Literature 1: Japanese Patent Laid-Open No. 2009-220298
Patent Literature 2: Japanese Patent Laid-Open No. 2001-300922

SUMMARY OF INVENTION

By the way, to improve heat shock resistance, a pillar-shaped honeycomb structure may be used in such a way that side faces of a plurality of pillar-shaped honeycomb structures (honeycomb segments) are joined and unified with a joining material. When joining the honeycomb segments with a joining material, it is desirable that the bottom faces be covered with a mask such that the joining material applied on the side faces will not adhere to the bottom faces of the honeycomb segments. However, conventionally a problem exists in that a mask for preventing adhesion of joining material is not likely to adhere closely to the bottom face, and some of the cells are clogged.

The present invention has been created in view of the above described circumstances, and has its object, in one aspect, to provide a bottom face processing method of a pillar-shaped honeycomb structure for improving adhesiveness of a mask that is used for preventing adhesion of joining material. The present invention, in another aspect, has its object to provide a manufacturing method of a fired honeycomb structure utilizing the bottom face processing method of the pillar-shaped honeycomb structure according to the present invention. In a further aspect, the present invention has its object to provide a manufacturing method of a joined body utilizing the manufacturing method of the fired honeycomb structure according to the present invention.

The present inventors have conducted diligent study to solve the above described problems, and have found that after a mask for plugging is peeled off, a plugged portion protrudes slightly in a convex shape by an amount of the thickness of the mask. They have found that by removing the slightly protruded plugged portion, the mask for preventing adhesion of joining material becomes easier to adhere closely to the bottom face of the pillar-shaped honeycomb structure, thereby effectively preventing clogging of the cells by the joining material. The present invention has been completed based on the findings and is exemplified as described below.

[1]

A bottom face processing method of a pillar-shaped honeycomb structure including steps of:

preparing a pillar-shaped honeycomb structure including a plurality of first cells which extend in parallel with each other from a first bottom face to a second bottom face, and each of which is opened in the first bottom face and has a protruding plugged portion in the second bottom face, and a plurality of second cells each of which is adjacent to at least one of the first cells with a partition wall interposed therebetween, which extend in parallel with each other from the first bottom face to the second bottom face, and each of which has a protruding plugged portion in the first bottom face, and is opened in the second bottom face; and removing the protruding portion from the plugged portion of each of the first cells and the second cells of the pillar-shaped honeycomb structure.

[2]

The bottom face processing method of the pillar-shaped honeycomb structure according to [1], wherein the step of removing the protruding portion includes bringing a plurality of brush bristles into contact with the plugged portion of each of the first bottom face and the second bottom face while rotating at least one rotary brush which includes a base which is rotatable around a rotational axis, and the brush bristles implanted to a surface of the base, and whose rotational axis is parallel with the extending direction of the first cells and the second cells.

[3]

The bottom face processing method of the pillar-shaped honeycomb structure according to [2], in the at least one rotary brush, the center of gravity of a surface region of the base in which the brush bristles are implanted is located at a position decentered from the rotational axis.

[4]

The bottom face processing method of the pillar-shaped honeycomb structure according to [3], wherein the rotational axis is positioned inside an outer peripheral contour of the surface region of the base in which the brush bristles are implanted.

[5]

The bottom face processing method of the pillar-shaped honeycomb structure according to [3] or [4], wherein the center of gravity of the surface region of the base in which the brush bristles are implanted is located at a position decentered by not less than 3 mm from the rotational axis.

[6]

The bottom face processing method of the pillar-shaped honeycomb structure according to any one of [2] to [5], wherein the step of removing the protruding portion includes relatively moving the at least one rotary brush in a direction parallel with the first bottom face and the second bottom face of the pillar-shaped honeycomb structure.

[7]

The bottom face processing method of the pillar-shaped honeycomb structure according to any one of [2] to [6], wherein the step of removing the protruding portion is performed while the first bottom face and the second bottom face of the pillar-shaped honeycomb structure are interposed between one or more pairs of the rotary brushes.

[8]

The bottom face processing method of the pillar-shaped honeycomb structure according to any one of [2] to [7], wherein the base has an annular surface region in which the brush bristles are implanted, and includes a suction port in communication with a suction apparatus in a portion on inner side of an inner peripheral contour of the surface region, and wherein the suction apparatus is operated while the step of removing the protruding portion is performed, and the removed protruding portion is suctioned from the suction port.

[9]

A manufacturing method of a fired honeycomb structure, including steps of:

obtaining a pillar-shaped honeycomb structure having been subjected to the bottom face processing by performing the bottom face processing method of the pillar-shaped honeycomb structure according to any one of [1] to [8]; and firing the pillar-shaped honeycomb structure having been subjected to the bottom face processing.

[10]

A manufacturing method of a joined body, including step of:

obtaining a plurality of fired honeycomb structures by performing the manufacturing method of a fired honeycomb structure according to [9]; and joining side faces of the plurality of fired honeycomb structures via a joining material with a mask being bonded to both bottom faces of each fired honeycomb structure.

According to an embodiment of a bottom face processing method of a pillar-shaped honeycomb structure according to the present invention, the mask for preventing adhesion of joining material becomes easier to adhere close to the bottom face, thus enabling to effectively prevent clogging of cells by the joining material.

According to a preferred embodiment of a bottom face processing method of a pillar-shaped honeycomb structure according to the present invention, it becomes possible to remove plugged portion without giving damages such as chipping and gouging to the bottom face of the honeycomb structure when removing the plugged portion.

According to a preferred embodiment of a bottom face processing method of a pillar-shaped honeycomb structure according to the present invention, it is possible to automate the step of removing plugged portion, thus improving working efficiency.

BRIEF DESCRIPTION OF THE DRAWINGS

FIG. 3-1 is a perspective view to schematically show an exemplary structure of a rotary brush;

FIG. 3-2 shows a plane structure (a) and a side structure (b) of the rotary brush;

DETAILED DESCRIPTION OF THE PREFERRED EMBODIMENTS

Next, embodiments of the present invention will be described in detail with reference to the drawings. The present invention will not be limited to the embodiments below, and it should be understood that appropriate modifications, improvements, and the like may be made to the design within a range not departing from the spirit of the present invention based on normal knowledge of a person skilled in the art.

(1. Pillar-Shaped Honeycomb Structure)

Figure 1:
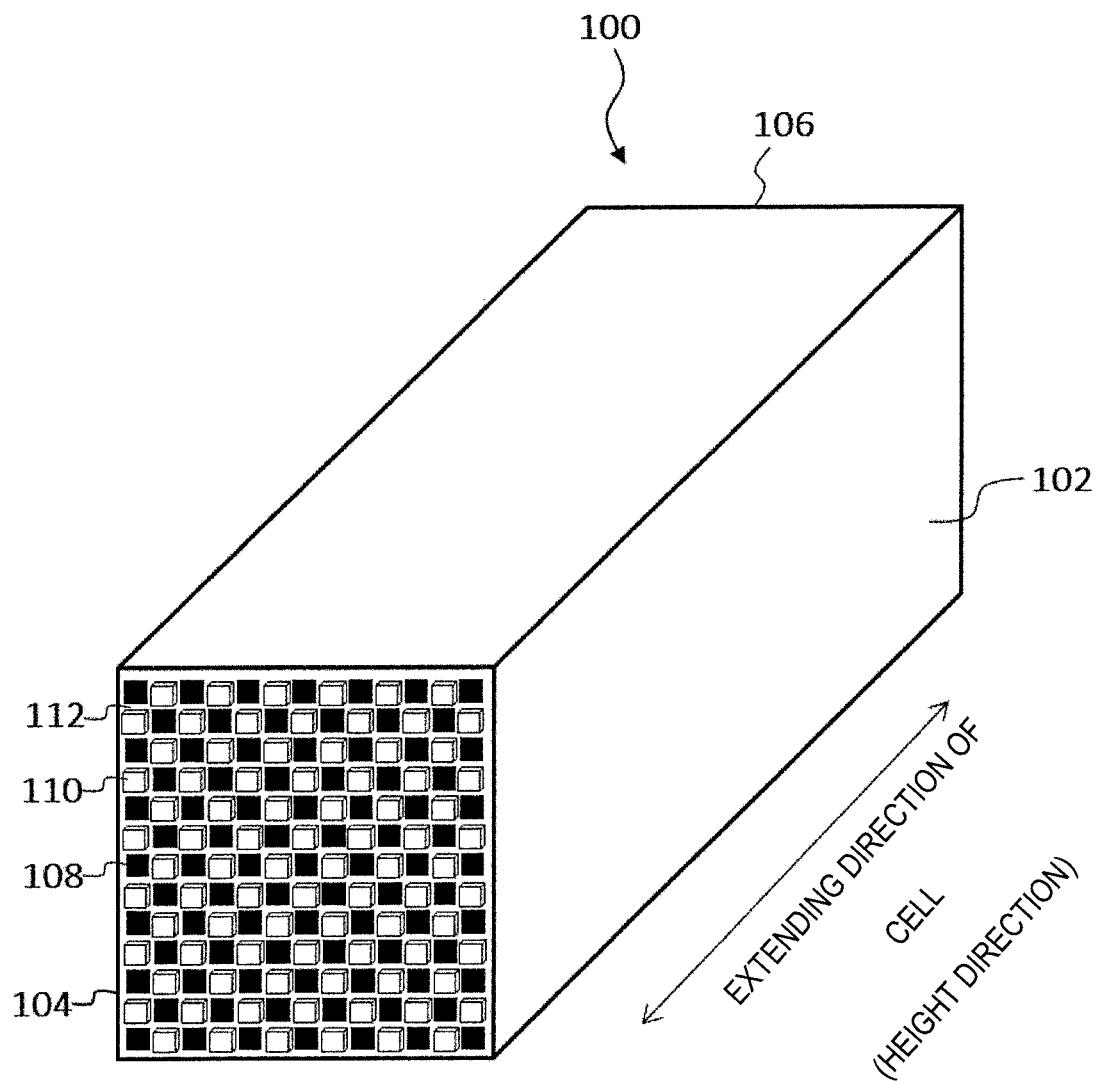
FIG. 1 is a perspective view to schematically show one example of a pillar-shaped honeycomb structure, which may be a subject of a bottom face processing method according to the present invention.

FIG. 1 is a perspective view to schematically show one example of a pillar-shaped honeycomb structure which may be a subject of a bottom face processing method relating to the present invention. An illustrated pillar-shaped honeycomb structure 100 includes: an outer peripheral side wall 102; a plurality of first cells 108 which are arranged on inner side of the outer peripheral side wall 102 and extend parallel with each other from a first bottom face 104 to a second bottom face 106, and each of which is opened in the first bottom face 104 and has a protruding plugged portion in the second bottom face 106; and a plurality of second cells 110 which are arranged on inner side of the outer peripheral side wall 102 and extend in parallel with each other from the first bottom face 104 to the second bottom face 106, and each of which has a protruding plugged portion in the first bottom face 104 and is opened in the second bottom face 106. Moreover, the illustrated pillar-shaped honeycomb structure 100 includes a porous partition wall 112 for forming sections of the first cells 108 and the second cells 110, in which the first cells 108 and the second cells 110 are adjacently disposed alternately interposing the partition wall 112, and both bottom faces form a checker pattern. In the pillar-shaped honeycomb structure according to the illustrated embodiment, all of the first cells 108 are adjacent to second cells 110, and all of the second cells 110 are adjacent to first cells 108. However, all the first cells 108 need not necessarily be adjacent to second cells 110, and all the second cells 110 need not necessarily be adjacent to first cells 108.

The outer shape of the honeycomb structure will not be specifically limited as long as it has a pillar shape, and may be, for example, a pillar shape having a circular bottom face (cylindrical shape), a pillar shape having an oval-shaped bottom face, a pillar shape having a polygonal bottom face (rectangular, pentagonal, hexagonal, heptagonal, and octagonal shapes, etc.), or the like. Further, in the perspective of improving heat shock resistance, the size of the honeycomb structure is such that a bottom face area is preferably 2000 to 20000 mm$^2$, and more preferably 5000 to 15000 mm$^2$.

Although there is no limitation on the shape of cell in a section perpendicular to the extending direction of cell (height direction), it is preferably a rectangular, hexagonal, or octagonal shape, or combination thereof. Among those, a square shape and a hexagonal shape are preferred. By designing the cell shape in this way, pressure loss when exhaust gas is flown through a honeycomb structure is decreased, thus achieving excellent cleaning performance when used as a filter.

A pillar-shaped honeycomb structure can be fabricated, for example, in the following procedure. A raw material composition containing a ceramic raw material, a dispersion medium, a pore former and a binder is kneaded to form green body, and thereafter the green body is subjected to extrusion to form an unfired pillar-shaped honeycomb structure. Additives such as a dispersant can be mixed to the raw material composition as needed. In extrusion, a die having a desired overall shape, a cell shape, a partition wall thickness, a cell density, or the like may be used.

Examples of ceramic raw material include, but not limited to, raw materials for obtaining ceramics such as cordierite, mullite, zircon, aluminum titanate, silicon carbide, silicon nitride, zirconia, spinel, indialite, sapphirin, corundum, and titania. Specifically, without being limited to, silica, talc, alumina, kaolin, serpentine, pyroferrite, brucite, boehmite, mullite, magnesite, etc. can be mentioned. The ceramic raw materials may be used solely in one kind, or in combination of two or more kinds.

After the unfired pillar-shaped honeycomb is dried, using a mask which has an area larger than that of one bottom face of the honeycomb structure, adhesive surface of the mask is bonded so as to cover the entire bottom face of the honeycomb structure and a part of opposing pair of side faces. After apertures are formed by means of laser processing utilizing image processing in the portion of the mask which cover cells in which plugged portion should be arranged, the bottom face part onto which the mask is bonded is immersed in a plugging slurry to fill an end part of the cell with the plugging slurry from the apertures. Plugging is also performed onto the other bottom face in a similar manner to obtain a honeycomb structure in which cells on both bottom faces are alternately plugged with the plugging slurry. By peeling off the mask after the honeycomb structure in which the plugging slurry is filled in both bottom faces is dried, a pillar-shaped honeycomb structure in which the plugged portion remains in a convex shape by the thickness of the mask can be obtained.

Although the material of the mask for plugging is not particularly limited, it is preferably polypropylene (PP), polyethylene terephthalate (PET), polyimide, or Teflon (registered trademark) since these are easy to be thermally processed to form apertures. Moreover, the mask is preferably provided with an adhesive layer, and the material of the adhesive layer is preferably acrylic resins, rubber-based resins (for example, rubbers mainly composed of natural rubber or synthetic rubber) or silicone-based resins.

As the mask for plugging, for example, an adhesive film having a thickness of 20 to 50 μm can be suitably used.

As the plugging slurry, for example, those which are prepared by mixing a ceramic powder, a dispersion medium (for example, water etc.) and, as needed, additives such as a binder, a deflocculant, a foaming resin and the like can be used. The ceramic is preferably a ceramic containing at least one kind selected from the group consisting of cordierite, mullite, zircon, aluminum titanate, silicon carbide, silicon nitride, zirconia, spinel, indialite, sapphirin, corundum, and titania, and more preferably the same material as the honeycomb structure. As the binder, polyvinyl alcohol, methyl cellulose and the like can be mentioned.

(2. Bottom Face Processing)

Figure 2:
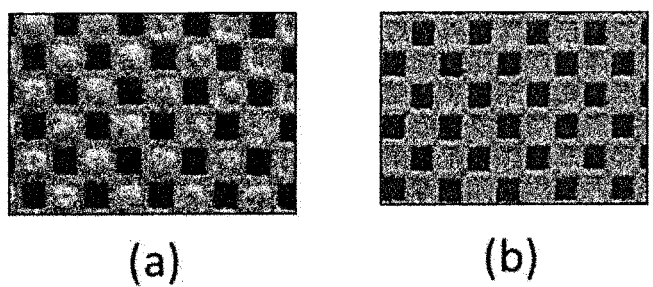
FIG. 2 is a photomicrograph (a) of a bottom face portion of the honeycomb structure before protruding plugged portion is removed, and a photomicrograph (b) of a bottom face portion of the honeycomb structure after protruding plugged portion is removed.

A bottom face processing method of a pillar-shaped honeycomb structure according to the present invention includes, in one embodiment, a step of removing the protruding portion (hereinafter, referred to as "convex portion") from the plugged portion of each of the first cells and the second cells of the honeycomb structure. As a result of removing the convex portion, a mask for preventing adhesion of joining material becomes easier to adhere closely to the bottom face, and it is possible to effectively prevent clogging of cells due to the joining material which drips down toward the bottom face side when side faces of a plurality of honeycomb structures are joined with the joining material in a later process. Exemplarily, a photomicrograph (a) of a bottom face portion of the honeycomb structure before the protruding plugged portion is removed, and a photomicrograph (b) of a bottom face portion of the honeycomb structure after the protruding plugged portion is removed are shown in FIG. 2. Although the bottom face processing can be performed on either one of an unfired honeycomb structure and a honeycomb structure after firing, it is preferably performed on the unfired honeycomb structure. That is because since the honeycomb structure is hardened after firing, a risk occurs that the honeycomb structure may be broken when performing the bottom face processing.

Regarding the method for removing the convex portion, there is no particular restriction and, for example, a method of brushing, a method of cutting with a cutter, a method of polishing with a grinding stone or hard sponge, or the like can be mentioned. Considering work efficiency, brushing is preferable. Although removal of the convex portion may be performed manually, it is preferably performed automatically considering industrial processing speed. For this reason, removal of the convex portion is, as shown in FIGS. 3-1 and 3-2, preferably performed by using a rotary brush 300 which includes a base 310 which is rotatable around a rotational axis A, and a plurality of brush bristles 320 implanted on the surface of the base 310.

In the perspective of improving homogeneity of the bottom face of the pillar-shaped honeycomb structure after bottom face processing, it is preferable to remove the convex portion by using two or more rotary brushes having different rotational directions, or by reversing the rotational direction of one rotary brush in the middle of the course.

Figures 1, 3:
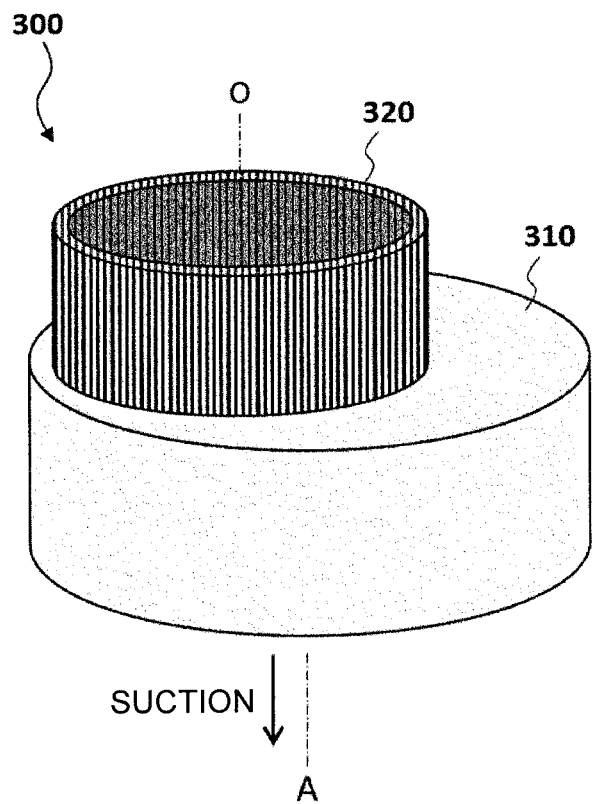
Figures 2, 3:
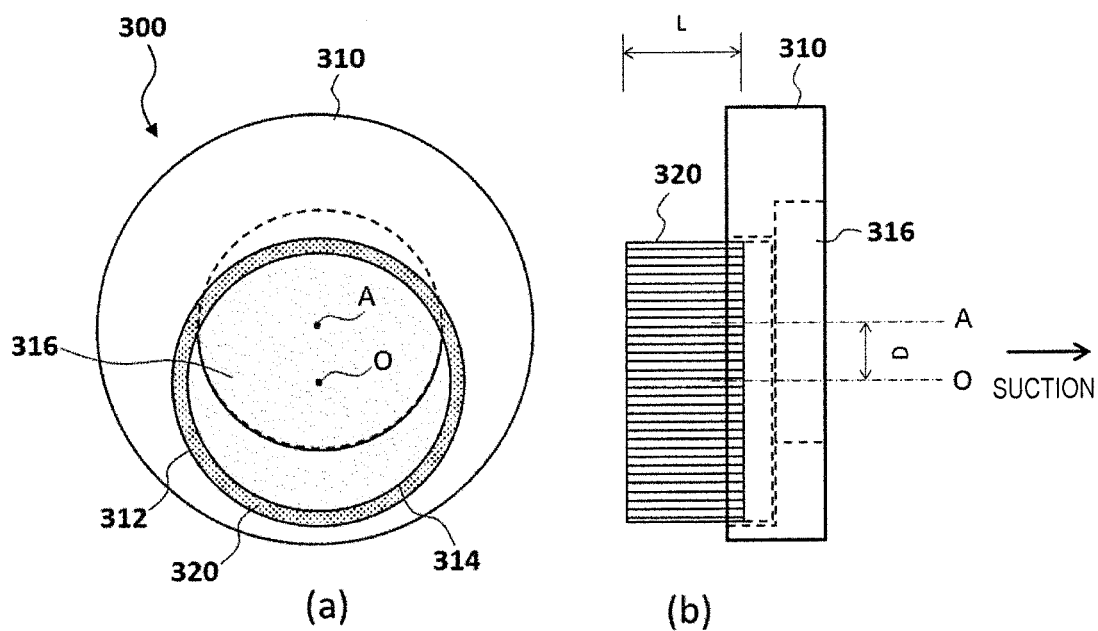

Referring to FIG. 3-2, the size of outer peripheral contour 312 of the surface region of the base 310, where a plurality of brush bristles 320 are implanted, may be appropriately set in the perspective of improving work efficiency depending on the size of the bottom surface area of the honeycomb structure. For example, a bottom surface area X of the honeycomb structure and an area Y surrounded by the outer peripheral contour 312 preferably satisfies a relational expression of $0.5 \leq Y/X \leq 4.5$, and more preferably satisfies a relational expression of $1.0 \leq Y/X \leq 3.5$.

To prevent removed convex portion and the dust which is generated during removal procedure of the convex portion, from entering into the cells, the removal of convex portion is preferably performed while being suctioned by a suction apparatus (not shown). Therefore, it is preferable that the base 310 includes a suction port 316 in communication with the suction apparatus, and the suction apparatus is operated to suction removed convex portion from the suction port 316 while convex portion is removed. The suction port 316 can be made in communication with the suction apparatus, for example, via a piping such as a hose. In a preferred embodiment, the base 310 has a surface region of an annular shape (for example, circular ring shape) in which the brush bristles 320 are implanted, and is provided with a suction port 316 in communication with a suction apparatus in a portion on an inner side of an inner peripheral contour 314 of the surface region. This configuration allows efficient suction of removed convex portion.

The rotary brush is preferably driven by a motor whose rotational speed can be controlled by an inverter. As a result of the rotational speed of the rotary brush being variable, it becomes possible to set an appropriate rotational speed in accordance with the material of the honeycomb structure, the state of the convex portion, and the like. In general, as the rotational speed of the rotary brush increases, removal efficiency of the convex portion will be improved; however, excessively high rotational speed may cause damage to the honeycomb structure, and therefore it is preferable to set the rotational speed considering the balance between them. The rotational speed of the rotary brush may be, for example, 100 to 600 rpm, typically 200 to 500 rpm, and more typically 300 to 400 rpm.

The length L of the brush bristles 320 may be appropriately set according to the material and thickness of the brush bristles or the like. As the length of the brush bristles decreases, its resilience increases, thereby increasing the removal efficiency of the convex portion; however, excessively short length is more likely to damage the honeycomb structure, it is preferable that the length L of the brush bristles 320 is set in consideration of the balance therebetween. In the perspective of increasing the removal efficiency of the convex portion, the length L of the brush bristles 320 may be not more than 50 mm, may also be not more than 40 mm, and may further be not more than 30 mm. On the other hand, in the perspective of suppressing damages to the honeycomb structure, the length L of the brush bristles 320 may be not less than 10 mm, may also be not less than 15 mm, and may further be not less than 20 mm.

Examples of the material of the brush bristles include, but not limited to, nylon, polypropylene, vinyl chloride, polyester, animal fiber (for example, horse hair, etc.). Among these, nylon is preferable, since it excels in wear resistance and flexibility.

The diameter (wire diameter) of the brush bristles may be 0.2 to 0.8 mm, typically 0.3 to 0.6 mm, and more typically 0.4 to 0.5 mm.

It is advantageous in the perspective of removal efficiency of the convex portion that the brush bristles be in contact with the bottom face of the honeycomb structure so as to be nearly perpendicular thereto. For this reason, an angle of implanting direction of the brush bristles (a direction of brush bristles at a root portion) with respect to the rotational axis direction is preferably 0 to 45°, more preferably 0 to 20°, and further preferably 0 to 10°.

As the press-in amount (brush press-in amount) of the brush bristles in a direction perpendicular to the bottom face of the honeycomb structure increases, the removal efficiency of the convex portion will increase; however, excessively large press-in amount increases the brushing pressure, thus increasing a risk of damaging the honeycomb structure, and therefore the brush press-in amount is preferably set in consideration of the balance of the both. In the perspective of increasing the removal efficiency of the convex portion, though it depends on the material, length and thickness of the brush bristles, the brush press-in amount may be not less than 0.1 mm, may also be not less than 0.5 mm, and may further be not less than 1 mm. On the other hand, in the perspective of suppressing damage to the honeycomb structure, the brush press-in amount may be not more than 4 mm, may also be not more than 3 mm, and may further be not more than 2 mm.

In the perspective of uniformly removing the convex portion without giving local load to the bottom faces of the honeycomb structure, it is preferable that the brush bristles be brought into contact with the protruding plugged portion of each of the first bottom face and second bottom face while rotating at least one rotary brush whose rotational axis is parallel with the direction in which the first cell and second cell extend (that is, height direction of the pillar-shaped honeycomb structure).

In this situation, the center of gravity O of the surface region in which the brush bristles are implanted is preferably positioned decentered from the rotational axis A (see FIG. 3-1 and FIG. 3-2). When the center of gravity O of the surface region in which the brush bristles are implanted corresponds to the rotational axis A, it is not possible to remove the convex portion in a region wider than the surface region. For this reason, for example, when the rotational axis A is located at a bottom surface center of the honeycomb structure, the removal effect of the convex portion by the brush tends to be weaker near the bottom face outer periphery in comparison between near the bottom face center and near the bottom face outer periphery of the honeycomb structure. Moreover, to enlarge the region in which the convex portion can be removed, it is necessary to displace the rotational axis.

In contrast to this, as shown in FIGS. 3-1 and 3-2, when the center of gravity O of the surface region of the base 310, in which the brush bristles 320 are implanted, is located at a position decentered from the rotational axis A, it is possible to remove the convex portion over a large region since the surface region is displaced by the decentering distance even when the rotational axis is not displaced.

The degree of decentering of the center of gravity O of the surface region from the rotational axis A may be appropriately set from the perspective of the area of the surface region, the bottom area of the honeycomb structure, and the uniformity of the removal effect of convex portion. In a preferred embodiment, the rotational axis is located inside the outer peripheral contour 312 of the surface region of the base in which the brush bristles are implanted. According to the present configuration, it is possible to prevent decrease in the removal efficiency of the convex portion near the rotational axis, and thereby improve uniformity of the removal effect of the convex portion, thus improving homogeneity of the bottom face after the bottom face processing.

Referring to FIG. 3-2, the distance (decentering distance D) by which the center of gravity O of the surface region is decentered from the rotational axis A to a direction perpendicular to the rotational axis A may be not less than 3 mm, preferably not less than 5 mm, and more preferably not less than 10 mm. Although the upper limit of the decentering distance D is not particularly set, considering the bottom area of a normal honeycomb structure to be used in filters for cleaning exhaust gas from a diesel engine, the decentering distance D is generally not more than 50 mm, and typically not more than 30 mm.

Figure 4:
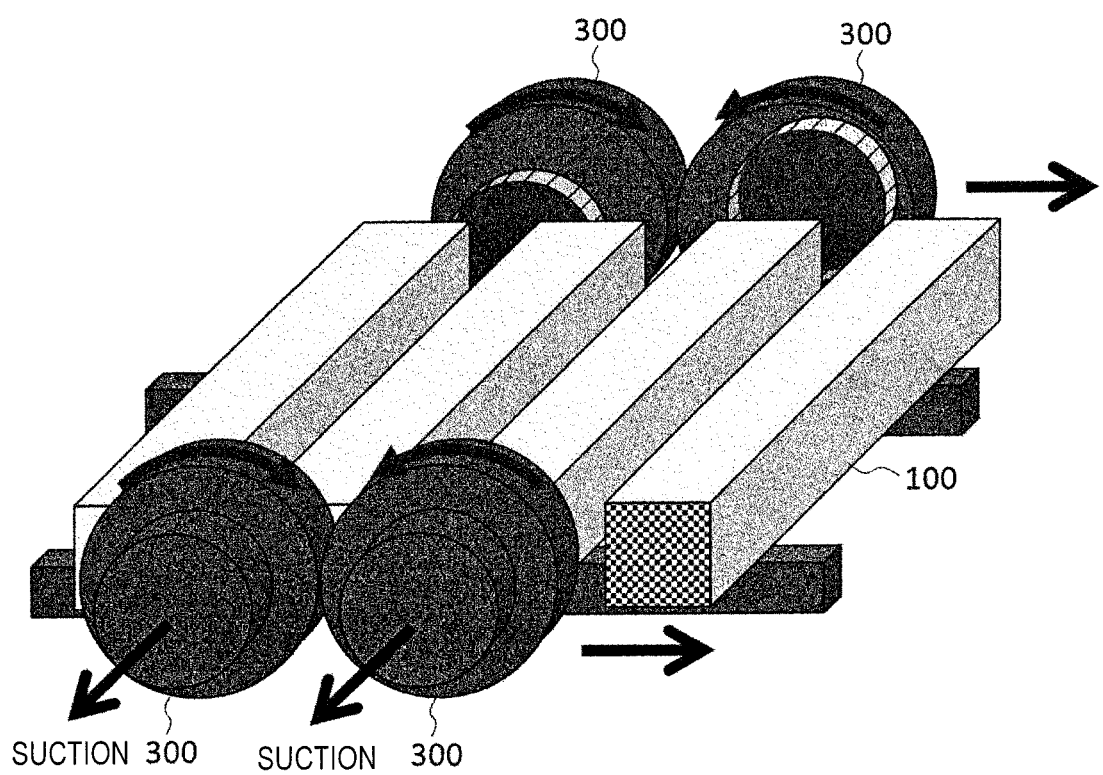
FIG. 4 is a schematic view to show a situation in which a bottom face processing of a plurality of pillar-shaped honeycomb structures is performed with one or more pairs of rotary brushes.
Figure 5:
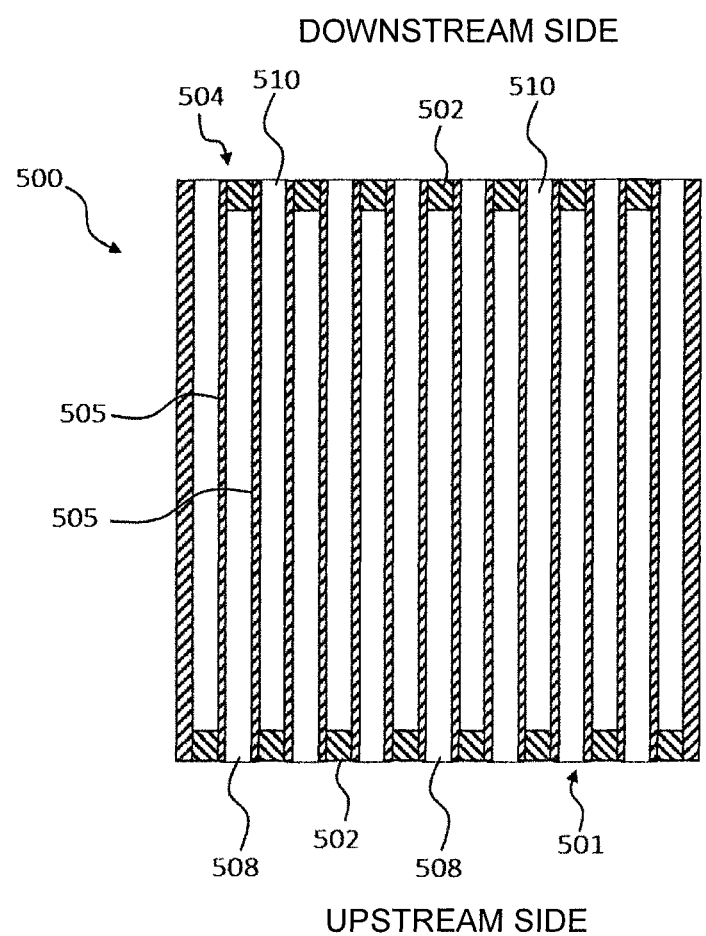
FIG. 5 is a schematic view to illustrate the structure of a pillar-shaped honeycomb structure as an exhaust gas cleaning filter.

From an industrial perspective, it is preferable that the removal process of the convex portion can be performed continuously on many pillar-shaped honeycomb structures subjected to the bottom face processing. For this reason, a preferred embodiment of the bottom face processing method of a pillar-shaped honeycomb structure according to the present invention includes relatively moving the at least one rotary brush in a direction in parallel with the first bottom face and the second bottom face of the pillar-shaped honeycomb structure. Referring to FIG. 4, it is understood that as a result of the rotary brush 300 being relatively moved in a direction in parallel with the first bottom face and the second bottom face of the pillar-shaped honeycomb structure 100, the bottom face processing of a plurality of pillar-shaped honeycomb structures 100 lined up in a direction perpendicular to the extending direction of cells (height direction) can be continuously performed.

Examples of a scheme in which the rotary brush is relatively moved in a direction in parallel with the first bottom face and the second bottom face include, for example, a scheme in which a plurality of pillar-shaped honeycomb structures are successively subjected to the bottom face processing by a rotary brush located at a fixed position while they are conveyed by a conveyor in one direction, and a scheme in which a plurality of pillar-shaped honeycomb structures lined up in one row are successively subjected to the bottom face processing by a rotary brush which is moved in parallel.

The removal of the convex portion protruding from the first bottom face and the removal of the convex portion protruding from the second bottom face may be performed either concurrently or separately. From the perspective of work efficiency, it is preferable that the removal of the convex portion protruding from the first bottom face and the removal of the convex portion protruding from the second bottom face are performed concurrently. Therefore, in a preferred embodiment of the bottom face processing method of a pillar-shaped honeycomb structure according to the present invention, as shown in FIG. 4, the process of removing protruding portion is performed while the first bottom face and the second bottom face of the pillar-shaped honeycomb structure 100 are interposed between the one or more pairs of the rotary brushes 300. When two or more pairs of the rotary brushes 300 are used, it is preferable that to improve the homogeneity of the first bottom face and the second bottom face of the pillar-shaped honeycomb structure 100 after the bottom face processing, at least one pair of the rotary brushes 300 are rotated in an opposite direction to that of the remaining at least one pair of the rotary brushes 300.

(3. Processes after Bottom Face Processing)

After performing the bottom face processing method of a pillar-shaped honeycomb structure according to the present invention and a pillar-shaped honeycomb structure having undergone the bottom face processing is obtained, it is possible to manufacture a fired honeycomb structure by firing the pillar-shaped honeycomb structure having undergone the bottom face processing. As the firing condition, any known condition can be adopted without particular limitation.

A degreasing process may be performed before the firing process. The combustion temperature of the binder is about 200° C. and the combustion temperature of the pore former is about 300 to 1000° C. Therefore, the degreasing process may be performed by heating a honeycomb formed body to about 200 to 1000° C. The heating time is not particularly limited and generally about 10 to 100 hours. The honeycomb formed body having undergone the degreasing process is referred to as a calcined body. Depending on the material composition of the honeycomb formed body, the firing process can be performed, for example, by heating the calcined body at 1350 to 1600° C. for 3 to 10 hours.

It is possible to form a segment joined body by utilizing the fired honeycomb structure as a honeycomb segment and joining side faces of a plurality of honeycomb segments with a joining material, thus forming an integrated body. A segment joined body can be manufactured, for example, in the following way. The joining material is applied to joining surfaces (side faces) with a mask for preventing adhesion of joining material being bonded to both bottom faces of each honeycomb segment. The bottom faces of the honeycomb segment is smoothed by the above described bottom face processing, and thereby the mask for preventing adhesion of joining material has become easier to adhere closely to the bottom face of the honeycomb segment. As a result of this, since the joining material dripping toward the bottom face when the joining material is applied to the side face of the honeycomb segment is not likely to enter between the mask and the honeycomb segment, advantage can be achieved in that it is possible to effectively prevent a phenomenon that the joining material infiltrates into an opening part of the cell, thus clogging the cell.

Next, these honeycomb segments are disposed adjacent to each other such that side faces of adjacent segments are opposed to each other, and the adjacent honeycomb segments are pressure bonded, thereafter being heated and dried. In this way, a segment joined body in which side faces of adjacent honeycomb segments are joined with the joining material is fabricated. The segment joined body may be ground in the outer peripheral part to obtain a desired shape (for example, cylindrical shape) and then, after a coating material is applied to the outer peripheral surface, may be heated and dried to form an outer peripheral wall.

The material for the mask for preventing adhesion of joining material is not particularly limited and synthetic resins such as polypropylene (PP), polyethylene terephthalate (PET), polyimide, or Teflon (registered trademark) may be suitably used. Moreover, the mask is preferably provided with an adhesive layer, and the material of the adhesive layer is preferably acrylic resins, rubber based resins (for example, rubbers mainly composed of natural rubber or synthetic rubber) or silicone-based resins.

As the mask for preventing adhesion of joining material, for example, an adhesive film having a thickness of 20 to 50 μm can be suitably used.

As the joining material, those prepared by mixing, for example, a ceramic powder, a dispersion medium (for example, water etc.) and, as needed, additives such as a binder, a deflocculant, a foaming resin, and the like can be used. The ceramic is preferably a ceramic containing at least one kind selected from the group consisting of cordierite, mullite, zircon, aluminum titanate, silicon carbide, silicon nitride, zirconia, spinel, indialite, sapphirin, corundum, and titania, and more preferably the same material as the honeycomb structure. As the binder, polyvinyl alcohol, methyl cellulose and the like can be mentioned.

Examples

Hereinafter, examples are illustrated for better understanding of the present invention and its benefits; however, the present invention will not be limited to the examples.
<1. Bottom Face Processing>
(No. 1 to 7)

An unfired honeycomb structure made of SiC was prepared, which had a cuboid shape with 38 mm long, 38 mm width, and 154 mm height, in which each cell extended in the height direction, and the cell density was 46.5/cm$^2$. An adhesive surface of a mask (thickness of 36 μm) made of PET (polyethylene terephthalate) was bonded to the unfired honeycomb structure so as to cover the whole of one bottom face and a part of a pair of opposed side faces thereof. Portion of the mask which covered cells in which plugged portion were to be arranged respectively was subjected to laser processing utilizing image processing to form apertures, and thereafter the bottom face part to which the mask was bonded was immersed in a plugging slurry, which contains SiC powder and metal Si powder, to fill an end part of each cell with the plugging slurry from the apertures. Similarly, plugging was performed on the other bottom face as well, thereby obtaining a honeycomb structure in which cells of both bottom faces were plugged with plugging slurry in an alternate manner. Next, the honeycomb structure filled with the plugging slurry was dried at 150° C. for 0.4 hours. After drying, the masks bonded to both bottom faces of the honeycomb structure were peeled off. Microscopic observation of the plugged portion confirmed that each plugged portion protruded in a convex shape by an amount of the thickness of the mask.

Next, as shown in FIGS. 3-1 and 3-2, one pair of rotary brushes were prepared, in which a plurality of nylon brush bristles (brush bristle length: see Table 1, wire diameter: 0.4 mm) were implanted in a circular ring shape having an outer diameter of 60 mm to the surface of a disc base having an outer diameter of 90 mm. In each brush, the center of gravity of the circular ring region of the base surface to which a plurality of brush bristles were implanted was located at a position decentered from the rotational axis by a decentering distance listed in Table 1 according to Test Nos. Moreover, each brush had a suction port in communication with the suction apparatus on inner side of the inner peripheral contour of the surface region of the base to which brush bristles were implanted. Each rotary brush was driven by a motor, and its rotational speed was changeable by an inverter.

The bottom face processing of a honeycomb structure was performed by rotating the brush in one direction such that the rotational axis was parallel with the extending direction of the cells while the both bottom faces of the honeycomb structure were interposed between the prepared pair of rotary brushes, and the suction apparatus was operated, thus relatively moving the rotary brush in a direction parallel with the both bottom faces of the pillar-shaped honeycomb structure. In this occasion, a press-in amount of the brush bristle (brush press-in amount) in a direction perpendicular to the bottom face of the honeycomb structure, the brush rotational speed, and the processing time were set to values indicated in Table 1 according to Test Nos. Moreover, the angle of implantation direction of the brush bristles with respect to the rotational axis was set to 0°.

Bottom face quality of obtained each honeycomb structure was confirmed.

In No. 1, convex portion of the plugged portion of the honeycomb structure was able to be removed without causing defects such as chipping and gouging in the honeycomb structure.

In No. 2, a rotary brush having a brush bristle length shorter than that in No. 1 was used. As the brush bristle length decreases, the resilience of the brush bristle increases. Thus, there is concern about damages to the honeycomb if the brush bristle length is made smaller than that in No. 2.

In Nos. 3 and 4, the brush press-in amount was changed from No. 1. If the brush press-in amount is increased to be more than that in No. 3, it is predicted that the brushing pressure increases, thus increasing a risk of damaging the honeycomb structure. On the contrary, if the brush press-in amount is decreased to be less than that in No. 4, since the brushing pressure becomes weaker and the brush may become not in contact with the honeycomb structure due to positional shift of the honeycomb structure and changes of brush bristle length caused by wear, there is a risk that convex portion cannot be removed.

In Nos. 5 and 6, the brush rotational speed was changed from No. 1. If the brush rotational speed is more than in No. 5, since the frequency of contact to the honeycomb structure increases, there is possibility that chipping etc. occurs, and on the contrary, if the rotational speed is less than in No. 6, since the frequency of contact to the honeycomb structure decreases, there is possibility that removal of convex portion becomes incomplete.

In No. 7, the brush was not decentered. In this case, since there was observed a tendency that convex portion remained in four corners of the bottom face of the honeycomb structure, it was necessary to increase the processing time to be more than that in No. 1.
(No. 8)

As in Nos. 1 to 7, a honeycomb structure in which cells of both bottom faces were plugged alternately with a plugging slurry was fabricated, and the mask was peeled off after drying. Next, the processing of both bottom faces was manually performed by using a vacuum cleaner in which a brush having a brush bristle length indicated in Table 1 was equipped in a suction port. Although there was no problem in the bottom face quality, the processing time was longer compared with in No. 1.
(No. 9)

Similarly in Nos. 1 to 7, a honeycomb structure in which cells of both bottom faces were alternately plugged with a plugging slurry was fabricated, and the mask was peeled off after drying. Since thereafter no bottom face processing was performed at all, convex portion remained in the plugged portion.

<2. Joining of Honeycomb Structures>

For each Test No., 16 honeycomb structures which had been subjected to the bottom face processing were fired at about 1450° C. for 5 hours in Ar atmosphere. With each fired honeycomb structure thus obtained as a honeycomb segment, an adhesive surface of a mask made of PET (thickness of 70 μm) was bonded to the entire bottom face of each honeycomb segment. Next, a paste-like joining material containing SiC powder and a binder was coated on side faces of each honeycomb segment to form a coated layer such that the coated layer had a thickness of 1 mm. Next, on this honeycomb segment, another honeycomb segment was placed in such a way that the coated layer is in contact with the side face. Thereafter, this process was repeated to fabricate a honeycomb segment structure made up of a total of 16 honeycomb segments which were arranged in 4 by 4 matrix form. Thereafter, the honeycomb segment structure was applied with pressure from the outside, and thereafter was dried at 140° C. for 2 hours to obtain a segment joined body. Thereafter, the mask was peeled off from each honeycomb segment.

The bottom faces of the obtained segment joined body according to each test example were observed to confirm the presence or absence of clogged cell. Results are shown in Table 1. In Nos. 1 to 8, since convex portion of the plugged portion was removed, the mask for preventing adhesion of joining material adhered closely to the bottom faces, thereby effectively preventing clogging of cells. On the other hand, in No. 9, since convex portion of the plugged portion remained, a gap was generated between the mask for preventing adhesion of joining material and the bottom face of the honeycomb segment and the joining material infiltrated thereinto, thereby clogging some of the cells.

500 Pillar-shaped honeycomb structure
501 First bottom face
504 Second bottom face
502 Plugged portion
505 Partition wall
508 First cell
510 Second cell

What is claimed is:

1. A bottom face processing method of a pillar-shaped honeycomb structure comprising steps of:
   preparing a pillar-shaped honeycomb structure including
   a plurality of first cells which extend in parallel with each other from a first bottom face to a second bottom face, and each of which is opened in the first bottom face and has a plugged portion having a protruding portion in the second bottom face, and
   a plurality of second cells each of which is adjacent to at least one of the first cells with a partition wall interposed therebetween, which extend in parallel with each other from the first bottom face to the second bottom face, and each of which has a plugged portion having a protruding portion in the first bottom face, and is opened in the second bottom face; and
   removing the protruding portion from the plugged portion of each of the first cells and the second cells of the pillar-shaped honeycomb structure without the first bottom face and the second bottom face being masked, and
   wherein the step of removing the protruding comprises bringing a plurality of brush bristles into contact with the protruding portion of each of the first bottom face and the second bottom face while rotating at least one rotary brush which includes a base which is rotatable around a rotational axis, and the brush bristles implanted to a surface of the base, and whose rotational axis is parallel with the extending direction of the first cells and the second cells.

2. The bottom face processing method of the pillar-shaped honeycomb structure according to claim 1, wherein
   in the at least one rotary brush, a center of gravity of a surface region of the base in which the brush bristles are implanted is located at a position decentered from the rotational axis.

3. The bottom face processing method of the pillar-shaped honeycomb structure according to claim 2, wherein
   the rotational axis is positioned inside an outer peripheral contour of the surface region of the base in which the brush bristles are implanted.

TABLE 1

| No. | Brush work | Decentering distance [mm] | Brush bristle length [mm] | Brush press-in amount [mm] | Brush rotation speed [rpm] | Finishing quality | Finishing time [sec/piece] | Cell clogged during joining |
|---|---|---|---|---|---|---|---|---|
| 1 | Automatic | 13 | 25 | 1 | 330 | OK | 0.8 | Absent |
| 2 | Automatic | 13 | 15 | 1 | 330 | OK | 0.8 | Absent |
| 3 | Automatic | 13 | 25 | 2 | 330 | OK | 0.8 | Absent |
| 4 | Automatic | 13 | 25 | 0.5 | 330 | OK | 0.8 | Absent |
| 5 | Automatic | 13 | 25 | 1 | 500 | OK | 0.8 | Absent |
| 6 | Automatic | 13 | 25 | 1 | 200 | OK | 0.8 | Absent |
| 7 | Automatic | 0 | 25 | 1 | 330 | OK | 2 | Absent |
| 8 | Manual | 0 | 30 | — | — | OK | 3.7 | Absent |
| 9 | — | Without bottom face processing | | | | NG | 0 | Present |

DESCRIPTION OF REFERENCE NUMERALS

100 Pillar-shaped honeycomb structure
102 Outer peripheral side wall
104 First bottom face
106 Second bottom face
108 First cell
110 Second cell
112 Partition wall
300 Rotary brush
310 Base
312 Outer peripheral contour
314 Inner peripheral contour
316 Suction port
320 Brush bristle 4. The bottom face processing method of the pillar-shaped honeycomb structure according to claim 2, wherein
the center of gravity of the surface region of a base in which the brush bristles are implanted is located at a position decentered by not less than 3 mm from the rotational axis.

5. The bottom face processing method of the pillar-shaped honeycomb structure according to claim 1, wherein
the step of removing the protruding portion includes relatively moving the at least one rotary brush in a direction parallel with the first bottom face and the second bottom face of the pillar-shaped honeycomb structure.

6. The bottom face processing method of the pillar-shaped honeycomb structure according to claim 1, wherein
the step of removing the protruding portion is performed while the first bottom face and the second bottom face of the pillar-shaped honeycomb structure are interposed between one or more pairs of the at least one rotary brush.

7. The bottom face processing method of the pillar-shaped honeycomb structure according to claim 1, wherein
the base has an annular surface region in which the brush bristles are implanted, and includes a suction port in communication with a suction apparatus in a portion on inner side of an inner peripheral contour of the annular surface region, and wherein
the suction apparatus is operated while the step of removing the protruding portion is performed, and the removed protruding portion is suctioned from the suction port.

8. A manufacturing method of a fired honeycomb structure, comprising steps of:
obtaining a pillar-shaped honeycomb structure having been subjected to bottom face processing by performing the bottom face processing method of the pillar-shaped honeycomb structure according to claim 1; and
firing the pillar-shaped honeycomb structure having been subjected to the bottom face processing.

9. A manufacturing method of a joined body, including steps of:
obtaining a plurality of fired honeycomb structures by performing the manufacturing method of the fired honeycomb structure according to claim 8; and
joining side faces of the plurality of fired honeycomb structures via a joining material with a mask being bonded to both bottom faces of each of the fired honeycomb structures.

\* \* \* \* \*